US010678514B2

(12) United States Patent
Xue et al.

(10) Patent No.: US 10,678,514 B2
(45) Date of Patent: Jun. 9, 2020

(54) METHOD AND DEVICE FOR GENERATING CODE ASSISTANCE INFORMATION

(71) Applicant: ALIBABA GROUP HOLDING LIMITED, Grand Cayman (KY)

(72) Inventors: Ming Xue, Hangzhou (CN); Jinpeng Wu, Hangzhou (CN); Zhenyu Hou, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/143,988

(22) Filed: Sep. 27, 2018

(65) Prior Publication Data

US 2019/0026081 A1    Jan. 24, 2019

Related U.S. Application Data

(63) Continuation of application No. PCT/CN2017/077252, filed on Mar. 20, 2017.

(30) Foreign Application Priority Data

Mar. 28, 2016  (CN) .......................... 2016 1 0183039

(51) Int. Cl.
   *G06F 8/33* (2018.01)
   *G06F 9/44* (2018.01)
(52) U.S. Cl.
   CPC . *G06F 8/33* (2013.01); *G06F 9/44* (2013.01)
(58) Field of Classification Search
   None
   See application file for complete search history.

(56) References Cited

U.S. PATENT DOCUMENTS

| 5,822,592 A * | 10/1998 | Zhu | G06F 8/427 717/120 |
| 6,026,233 A * | 2/2000 | Shulman | G06F 8/33 715/201 |

(Continued)

FOREIGN PATENT DOCUMENTS

| CN | 102591470 A | 7/2012 |
| CN | 102880468 A | 1/2013 |

(Continued)

OTHER PUBLICATIONS

International Search Report and Written Opinion for Application No. PCT/CN2017/077252, dated Jun. 22, 2017, 9 pages.

(Continued)

*Primary Examiner* — Philip Wang
(74) *Attorney, Agent, or Firm* — Sheppard Mullin Richter & Hampton LLP

(57) ABSTRACT

A method for generating code assistance information comprises: obtaining input status information corresponding to a program development process, wherein the input status information comprises input content information and input language environment information; obtaining a preset grammar rule corresponding to the input status information, wherein the preset grammar rule stores an association relationship between different statement information, and different input status information corresponds to different preset grammar rules; and generating code assistance information corresponding to the input content information according to the input content information and the preset grammar rule corresponding to the input status information.

20 Claims, 5 Drawing Sheets

(56) References Cited

U.S. PATENT DOCUMENTS

| | | | |
|---|---|---|---|
| 6,427,228 B1 | 7/2002 | Wigger | |
| 6,427,230 B1 | 7/2002 | Goiffon et al. | |
| 6,675,370 B1 | 1/2004 | Sundaresan | |
| 6,714,978 B1 | 3/2004 | Porter | |
| 6,920,474 B2 | 7/2005 | Walsh et al. | |
| 6,941,510 B1 | 9/2005 | Ozzie et al. | |
| 6,957,416 B2 | 10/2005 | Adams | |
| 7,058,886 B1 | 6/2006 | Sulistio et al. | |
| 7,275,207 B2 | 9/2007 | Aureglia et al. | |
| 7,322,023 B2* | 1/2008 | Shulman | G06F 8/33 715/705 |
| 8,418,081 B2 | 4/2013 | Bartek et al. | |
| 2002/0046294 A1 | 4/2002 | Brodsky et al. | |
| 2002/0049788 A1 | 4/2002 | Lipkin et al. | |
| 2002/0049790 A1 | 4/2002 | Ricker et al. | |
| 2003/0028364 A1* | 2/2003 | Chan | G06F 8/33 704/1 |
| 2003/0056195 A1 | 3/2003 | Hunt | |
| 2003/0070159 A1 | 4/2003 | Webb | |
| 2003/0084425 A1 | 5/2003 | Glaser | |
| 2003/0221184 A1 | 11/2003 | Gunjal et al. | |
| 2004/0187090 A1 | 9/2004 | Meacham | |
| 2004/0261059 A1* | 12/2004 | Spencer | G06F 8/36 717/120 |
| 2005/0125766 A1* | 6/2005 | Hawley | G06F 8/33 717/100 |
| 2005/0125767 A1* | 6/2005 | Hawley | G06F 8/33 717/100 |
| 2005/0125773 A1* | 6/2005 | Hawley | G06F 8/33 717/109 |
| 2006/0130027 A1* | 6/2006 | Hutchison | G06F 8/33 717/141 |
| 2007/0083855 A1* | 4/2007 | Patel | G06F 9/454 717/127 |
| 2014/0173406 A1* | 6/2014 | Robelin | G06F 17/276 715/224 |
| 2016/0062745 A1 | 3/2016 | Rao et al. | |

FOREIGN PATENT DOCUMENTS

| | | |
|---|---|---|
| CN | 103294468 A | 9/2013 |
| CN | 104050183 A | 9/2014 |
| WO | 2015105498 A1 | 7/2015 |

OTHER PUBLICATIONS

International Preliminary Report on Patentability Chapter I for PCT Application No. PCT/CN2017/077252 dated Oct. 11, 2018 (11 pages).

First Search for Chinese Application No. 201610183039.0 dated Dec. 13, 2019 (1 page).

First Office Action for Chinese Application No. 201610183039.0 dated Dec. 23, 2019 (14 pages).

Würsch et al, "Supporting developers with natural language queries," International Conference on Software Engineering, May 1, 2010 (10 pages).

Search Report for European Application No. 17773075.1 dated Nov. 5, 2019 (8 pages).

Canovas Izquierdo et al., "Extracting models from source code in software modernization," Software & System Modeling, Springer Berlin Heidelberg, vol. 13, No. 2, Sep. 9, 2012 (22 pages).

* cited by examiner

```
INSERT |
         ABSOLUTE
         ACTION
         ADA
         ALL
         ALTER
         AND
         ALLOCATE
         ANY
         ARE
         Dot, space, and some other keys
```
FIG. 5

```
INSERT in|
          IN
          INDICATOR
          INITIALLY
          INNER
          INPUT
          INSENSITIVE
          INSERT
          INT
          INTEGER
          INTERSECT
          ^ ↓ and ^ ↑ will move an inserted symbol
```
FIG. 6

```
INSERT |
         INSERT (key words)
         INSERT INTO (key words)
         INSERT INTO TABLE (key words)
         INSERT OVERWRITE TABLE (key words)
         INSERT OVERWRITE DIRECTORY (key words)
         INSERT OVERWRITE LOCAL DIRECTORY (key words)
         Dot, space, and some other keys
```
FIG. 7

METHOD AND DEVICE FOR GENERATING CODE ASSISTANCE INFORMATION

CROSS REFERENCE TO RELATED APPLICATIONS

The present application is a continuation application of the International Patent Application No. PCT/CN2017/077252, filed on Mar. 20, 2017, and titled "METHOD AND DEVICE FOR GENERATING CODE ASSISTANCE INFORMATION." The PCT Application PCT/CN2017/077252 claims priority to the Chinese Patent Application No. 201610183039.0 filed on Mar. 28, 2016. The entire contents of all of the above applications are incorporated herein by reference in their entirety.

TECHNICAL FIELD

The present disclosure relates to the field of information technologies, and in particular, to a method and a device for generating code assistance information.

BACKGROUND

Recently, the integrated development environment (IDE) has become a mainstream tool for program design and development. As the complexity of program design languages continues to increase, a code assistance function is more widely applied in the IDE. A program developer may perform a subsequent input according to code assistance information. The code assistance function can reduce a load of a program developer for memorizing a syntax rule and names of language elements, reduce a quantity of characters entered by the program developer and an error rate, and improve the program development efficiency.

Currently, during code assistance, first, names of all language elements are used as code assistance information and displayed to the program developer, and then, code assistance information filtering is performed according to contents entered by the program developer. However, most information in the code assistance information is not needed by the program developer. For example, in the structured query language (SQL), the program developer enters an INSERT statement, and a schematic diagram of a display interface of existing code assistance information is shown in FIG. 5, and when the program developer continues to enter "in", a schematic diagram of a display interface of existing code assistance information obtained after filtering is shown in FIG. 6. Information in FIG. 5 and FIG. 6 is not needed by the program developer, and the program developer hardly chooses the information during an actual development process. Displaying of the information may cause interference to the program developer, leading to low precision of generated code assistance information. In addition, displaying of the unnecessary code assistance information may cause a waste of system resources.

SUMMARY

In view of this, embodiments of the present disclosure provide a method and a device for generating code assistance information, to resolve the technical problem of low precision for generated code assistance information.

In addition, the embodiments of the present disclosure further provide a method and a device for generating code assistance information, to resolve the problem that because displayed code assistance information includes a large amount of useless information, a waste of system resources is caused when the code assistance information is displayed.

To achieve the foregoing objective, the following technical solutions are provided in the present disclosure.

According to one aspect, the present disclosure provides a method for displaying code assistance information, including: receiving input status information obtained through an operation interface during a current program development process, where the input status information includes input content information and input language environment information; obtaining a preset grammar rule corresponding to the input status information, where the preset grammar rule stores an association relationship between different statement information, and different input status information corresponds to different preset grammar rules; and generating and outputting code assistance information corresponding to the input content information according to the input content information and the preset grammar rule corresponding to the input status information.

According to another aspect, the present disclosure provides a device for displaying code assistance information, including: an obtaining unit, configured to obtain input status information corresponding to a current program development process, where the input status information includes input content information and input language environment information, where the obtaining unit is further configured to obtain a preset grammar rule corresponding to the input status information, where the preset grammar rule stores an association relationship between different statement information, and different input status information corresponds to different preset grammar rules; and a generation unit, configured to generate code assistance information corresponding to the input content information according to the input content information and the preset grammar rule corresponding to the input status information.

According to another aspect, a device for generating code assistance information comprises a processor and a non-transitory computer-readable storage medium storing instructions that, when executed by the processor, cause the device to perform a method for generating code assistance information. The method comprises: obtaining input status information corresponding to a program development process, wherein the input status information comprises input content information and input language environment information; obtaining a preset grammar rule corresponding to the input status information, wherein the preset grammar rule stores an association relationship between different statement information, and different input status information corresponds to different preset grammar rules; and generating code assistance information corresponding to the input content information according to the input content information and the preset grammar rule corresponding to the input status information.

According to another aspect, a non-transitory computer-readable storage medium stores instructions that, when executed by a processor, cause the processor to perform a method for generating code assistance information. The method comprises: obtaining input status information corresponding to a program development process, wherein the input status information comprises input content information and input language environment information; obtaining a preset grammar rule corresponding to the input status information, wherein the preset grammar rule stores an association relationship between different statement information, and different input status information corresponds to different preset grammar rules; and generating code assistance information corresponding to the input content information according to the input content information and the preset grammar rule corresponding to the input status information.

By using the foregoing technical solutions, the technical solutions provided in the embodiments of the present disclosure have at least the following advantages:

The embodiments of the present disclosure provide a method and a device for generating code assistance information. First, the input status information corresponding to the current program development process is obtained, and the input status information includes the input content information and the input language environment information. The preset grammar rule corresponding to the input status information is obtained, the preset grammar rule stores the association relationship between different statement information, and different input status information corresponds to different preset grammar rules. The code assistance information corresponding to the input content information is generated according to the input content information and the preset grammar rule corresponding to the input status information. Compared with a current method that names of all language elements are used as code assistance information and displayed to a program developer, and code assistance information filtering is performed according to contents entered by the program developer, in the embodiments of the present disclosure, the code assistance information corresponding to the input content information is generated according to the input content information and the preset grammar rule corresponding to the input status information, so that the precision of the code assistance information can be improved, and the waste of system resources caused by the large amount of useless information in the code assistance information can be avoided.

The foregoing descriptions are merely a summary of the technical solutions of the present disclosure. To better understand the technical features of the present disclosure, implement the technical means according to the content of the specification, and make the foregoing and other objectives, features, and advantages more comprehensive, detailed implementations of the present disclosure are described below.

BRIEF DESCRIPTION OF THE DRAWINGS

By reading detailed descriptions of the following preferable implementations, other various advantages and benefits become clear to a person of ordinary skill in the art. The accompanying drawings are merely used to show the objective of the preferable implementations, but are not considered as a limitation to the present disclosure. In addition, in the entire accompanying drawings, same reference numerals represent the same components. In the accompanying drawings:

FIG. 5 is a schematic diagram of a display interface of existing code assistance information;

FIG. 6 is a schematic diagram of a display interface of existing filtered code assistance information;

FIG. 7 is a schematic diagram of a display interface of code assistance information according to an embodiment of the present disclosure.

DETAILED DESCRIPTION

The following describes in detail exemplary embodiments of the present disclosure with reference to the accompanying drawings. Although the accompanying drawings show exemplary embodiments of the present disclosure, it should be understood that the present disclosure may be implemented in various forms, and should not be limited by the described embodiments. To the contrary, the embodiments are provided, so that the present disclosure can be better understood, and the scope of the present disclosure can be completely conveyed to a person skilled in the art.

Figure 1:
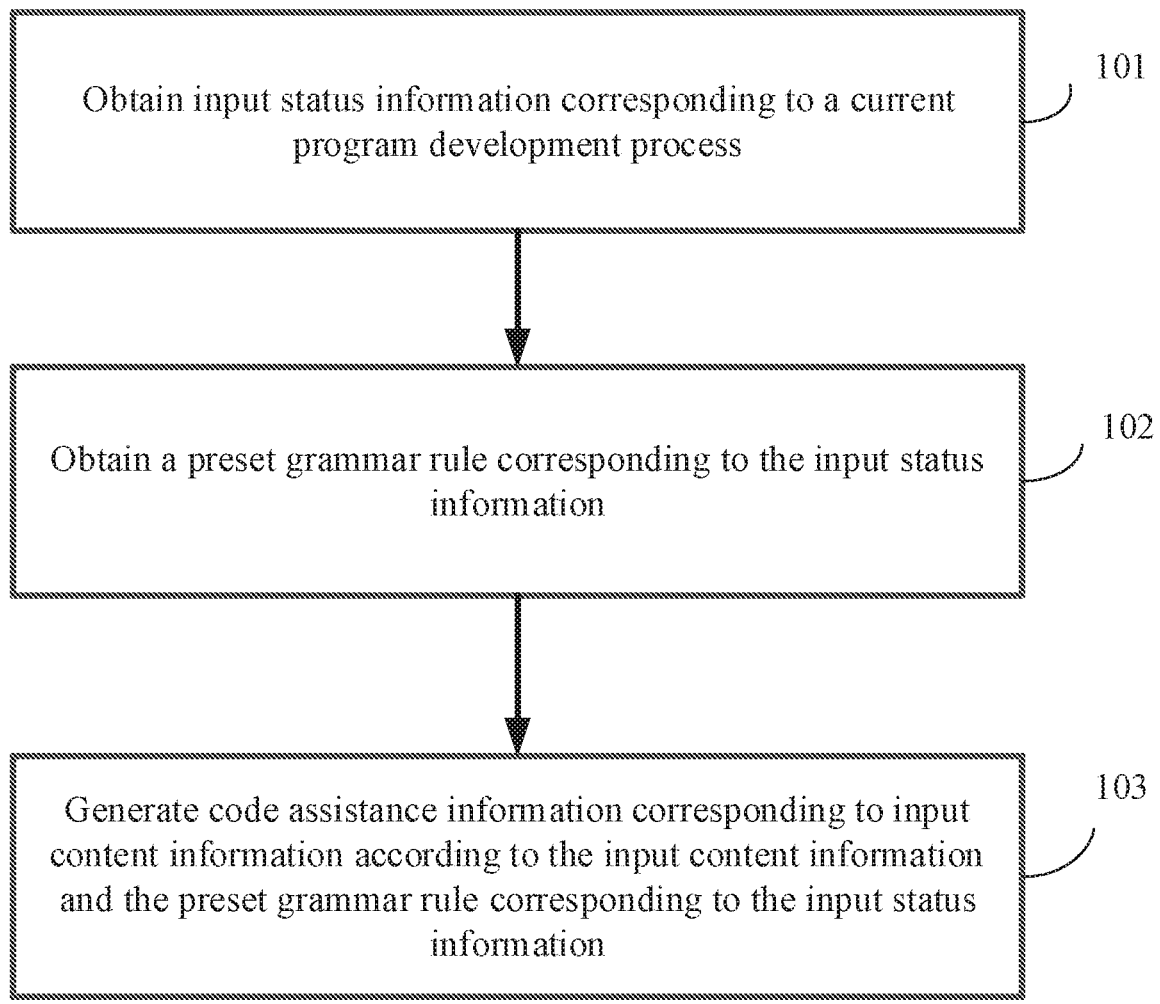
FIG. 1 is a flowchart of a method for generating code assistance information according to an embodiment of the present disclosure.

An embodiment of the present disclosure provides a method for generating code assistance information. As shown in FIG. 1, the method includes the following steps.

Step 101. Obtain input status information corresponding to a current program development process.

The input status information includes input content information and input language environment information. The input content information may include input statement information and cursor location information. For example, the input statement information is INSERT. The input language environment information may be a program design language used during a program development process, for example, a SQL, or a C language. The program design language is generally defined by a context-free grammar. The context-free grammar is a transform grammar, used to describe a context-free language. For example, particular statement information in the program design language or whether statement information occurs in a particular location does not depend on a context.

In the embodiments of the present disclosure, a user usually enters statement information in a text editor corresponding to the IDE, to perform program development. Therefore, the input status information corresponding to the program development process is input status information obtained by using the text editor. Step 101 may be for example: obtaining the input status information in the text editor corresponding to the current IDE.

Step 102. Obtain a preset grammar rule corresponding to the input status information.

The preset grammar rule stores an association relationship between different statement information, and different input status information corresponds to different preset grammar rules. The preset grammar rule may be a context-free grammar rule.

Different languages of the same statement information correspond to different context-free grammar rules. For example, statement information is an assignment statement, and the assignment statement corresponds to different context-free grammar rules in the Java language and the C language. Different statement information of the same Language corresponds to different context-free grammar rules. For example, an INSERT language corresponds to a context-free grammar rule in the SQL language, but corresponds to no context-free grammar rule in the C language. Therefore, different input status information corresponds to different context-free grammar rules during the program development process.

Step 103. Generate code assistance information corresponding to the input content information according to the input content information and the preset grammar rule corresponding to the input status information.

The code assistance information corresponding to the input content information may be code assistance information related to the input content information. The code assistance information is used to prompt content that is to be subsequently entered by the user. By using the code assistance information, a code writing speed can be increased, and spelling and syntax errors can be reduced, thereby improving the program development efficiency.

In the embodiments of the present disclosure, content information related to the input content information may be deduced according to the association relationship between different statement information stored in the preset grammar rule and the input content information, and then, the content information related to the input content information is determined as the code assistance information related to the input content information.

For example, a current input language environment is the SQL language, and current input content information is "INSERT". Then, content information related to "INSERT", for example, "INSERT OVERWRITE DIRECTORY" or "INSERT OVERWRITE LOCAL DIRECTORY", is generated according to a context-free grammar rule of INSERT in the SQL language, and then, the content information related to "INSERT" is determined as the code assistance information corresponding to "INSERT". The context-free grammar rule of INSERT in the SQL language stores an association relationship between "INSERT" and each statement information such as "INSERT OVERWRITE DIRECTORY" or "INSERT OVERWRITE LOCAL DIRECTORY".

In the embodiments of the present disclosure, the content information related to the input content information is generated according to the input content information and the preset grammar rule corresponding to the input status information, and then, the content information related to the input content information is determined as the code assistance information corresponding to the input content information, so that the precision of displaying the code assistance information can be improved, and the waste of system resources caused by the large amount of useless information in the code assistance information can be avoided.

In the method for generating code assistance information in the embodiments of the present disclosure, first, the input status information corresponding to the current program development process is obtained, and the input status information includes the input content information and the input language environment information. The preset grammar rule corresponding to the input status information is obtained, the preset grammar rule stores the association relationship between different statement information, and different input status information corresponds to different preset grammar rules. The code assistance information corresponding to the input content information is generated according to the preset grammar rule corresponding to the input status information. Compared with a current method that names of all language elements are used as code assistance information and displayed to a program developer, and code assistance information filtering is performed according to contents entered by the program developer, in the embodiments of the present disclosure, the code assistance information corresponding to the input content information is generated according to the input content information and the preset grammar rule corresponding to the input status information, so that the precision of the code assistance information can be improved, and the waste of system resources caused by the large amount of useless information in the code assistance information can be avoided.

Figure 2:
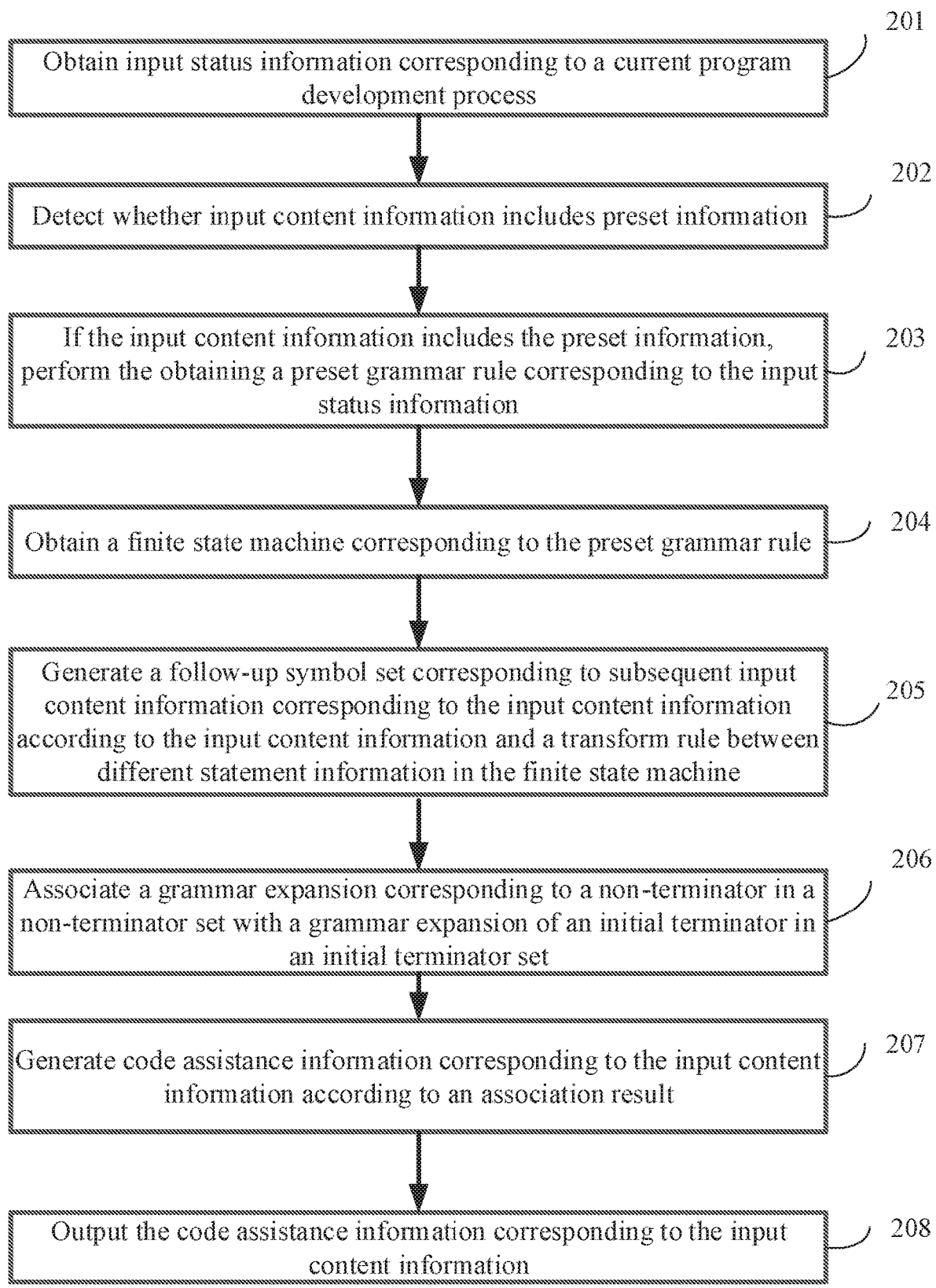
FIG. 2 is a flowchart of another method for generating code assistance information according to an embodiment of the present disclosure.

An embodiment of the present disclosure provides another method for generating code assistance information. As shown in FIG. 2, the method includes the following steps.

Step 201. Obtain input status information corresponding to a current program development process.

The input status information includes input content information and input language environment information. For corresponding descriptions of the input content information and the input language environment information, refer to the corresponding descriptions in the embodiment of FIG. 1, and details are not described herein again.

Step 202. Detect whether the input content information includes preset information.

The preset information may be special separation character information, for example, ",", and "(", or may be a trigger character, and this is not limited herein.

Step 203. If the input content information includes the preset information, obtain the preset grammar rule corresponding to the input status information.

The preset grammar rule stores an association relationship between different statement information, and different input status information corresponds to different preset grammar rules. The preset grammar rule may be a context-free grammar rule. For corresponding descriptions of the context-free grammar rule, refer to the corresponding descriptions in the embodiment of FIG. 1, and details are not described herein again.

Step 204. Obtain a finite state machine corresponding to the preset grammar rule.

The finite state machine stores a transform rule between different statement information. The finite state machine is a mathematical model representing a finite quantity of states and behaviors of transform and acting between the states.

In the embodiments of the present disclosure, before step 204, the method may further include: parsing and transforming the preset grammar rule into the finite state machine. For example, a grammar rule recognizer may parse and transform the preset grammar rule into the finite state machine. The grammar rule recognizer may be for example an open source syntax analyzer (ANTLR-Another Tool for Language Recognition, Antlr), a Yet Another Compiler Compiler (Yacc), or the like.

Step 205. Generate a follow-up symbol set corresponding to subsequent input content information corresponding to the input content information according to the input content information and the transform rule between different statement information in the finite state machine.

The follow-up symbol set includes a grammar production set of the transform rule, a non-terminator set corresponding to the grammar production set, and an initial terminator set corresponding to the grammar production set. The subsequent input content information may be content information related to the input content information.

In the embodiments of the present disclosure, step 205 may be for example: first, parsing and transforming the input content information into input content information in the finite state machine, which may be for example: parsing and transforming, by using the syntax parser, the input content information into the input content information in the finite state machine; and then, generating, by using a state transition analyzer, the follow-up symbol set corresponding to the subsequent input content information corresponding to the input content information according to the input content information in the finite state machine and the transform rule in the finite state machine.

In the embodiments of the present disclosure, for the convenience of descriptions, the input content information in the finite state machine is marked as S, the follow-up symbol set is marked as Follow(S), the grammar production set of the transform rule is marked as Rule(S), the non-terminator set corresponding to the grammar production is marked as N(S), and the initial terminator set corresponding to the grammar production is marked as E(S).

For example, the input content information of the user in the SQL development environment is "INSERT[I]", of which [I] represents a current cursor location. The input content information is parsed and transformed into the input content information "INSERT" in the finite state machine, and Follow(S)={N(S), E(S), Rule(S)} may be generated according to "INSERT" and the transform rule between different statement information in the finite state machine.

N (S)={insertClause}
E(S)={INSERT}
Rule (S)={{KW_INSERT KW_OVERWRITE destination ifNotExists?}, {KW_INSERT KW_INTO_KW_TABLE? tableOrPartition (LPAREN columnNameList RPAREN)?}}

Step 206. Associate a grammar expansion corresponding to a non-terminator in the non-terminator set with another grammar expansion of an initial terminator in the initial terminator set.

The grammar expansion corresponding to the non-terminator is a result representing that a grammar production corresponding to the non-terminator is expanded into a terminator sequence.

In the embodiments of the present disclosure, step 206 may be for example: when the grammar expansion corresponding to the non-terminator is equal to the grammar expansion of the initial terminator, determining the grammar expansion of the initial terminator as assistance candidate information of the subsequent input content information.

In some embodiments, before step 206, the method may further include: obtaining a grammar production corresponding to the non-terminator and corresponding to the initial terminator in the initial terminator set; and determining, as the grammar expansion corresponding to the non-terminator, a result obtained after all non-terminators in the grammar production are cyclically expanded until the all non-terminators are eliminated.

The grammar expansion corresponding to the non-terminator is marked as Template(N) herein. To describe a process of obtaining Template(N), an example is provided herein according to INSERT. As shown in the following, insertClause is a non-terminator, and grammar productions corresponding to insertClause are rule1 and rule2.

insertClause: rule1|rule2;
rule1={KW_INSERT KW_OVERWRITE destination ifNotExists?};
rule2={KW_INSERT KW_INTO_KW_TABLE? tableOrPartition (LPAREN columnNameList RPAREN)?};

A non-terminator in rule1 is destination, and because grammar productions corresponding to destination in the SQL language are rule3 and rule4:
destination: rule3|rule4;
rule3={(KW_LOCAL)? KW_DIRECTORY StringLiteral tableRowFormat? tableFileFormat?};
rule4={KW_TABLE tableOrPartition};

Definitions of grammar productions such as ifNotExists, StringLiteral, tableRowFormat, and tableFileFormat are not described in detail, but this does not affect the process of generating Template (N).

The initial terminator First set of a non-terminator destination={DIRECTORY, LOCAL DIRECTORY, TABLE};

grammar productions corresponding to initial terminators DIRECTORY and LOCAL DIRECTORY in the First set of the non-terminator destination are both rule3, and the non-terminators are expanded into DIRECTORY and LOCAL DIRECTORY, a grammar production of an initial terminator TABLE in the First set of the non-terminator destination is rule4, and the non-terminator is expanded into TABLE;

the First set of the non-terminator insertClause={INSERT};

because an initial terminator in the First set corresponding to the non-terminator insertClause is INSERT and is equal to E(S), grammar productions corresponding to INSERT are rule1 and rule2, a result obtained after the non-terminator destination in rule1 is cyclically expanded until all non-terminators are eliminated is:
template1=INSERT OVERWRITE DIRECTORY
template2=INSERT OVERWRITE LOCAL DIRECTORY
template3=INSERT OVERWRITE TABLE A result obtained after the non-terminator destination in rule2 is cyclically expanded until all non-terminators are eliminated is:
tempalte4=INSERT INTO
template5=INSERT INTO TABLE therefore, the following obtained grammar expansions are assistance candidate information of the subsequent input content information:
template1=INSERT OVERWRITE DIRECTORY
template2=INSERT OVERWRITE LOCAL DIRECTORY
template3=INSERT OVERWRITE TABLE
tempalte4=INSERT INTO
template5=INSERT INTO TABLE.

Step 207. Generate the code assistance information corresponding to the input content information according to an association result.

In the embodiments of the present disclosure, step 207 may be for example: determining the initial terminator and the assistance candidate information as the code assistance information corresponding to the input content information.

Further, before the determining the initial terminator and the assistance candidate information as the code assistance information corresponding to the input content information, the method may further include: obtaining historical input status information corresponding to the input status information, and sorting the initial terminator and the assistance candidate information according to the historical input status information. For example, the assistance candidate information and the initial terminator may be sorted according to quantities of times that the assistance candidate information and the initial terminator occurs in the historical input status information or priorities of the assistance candidate information and the initial terminator, and this is not limited herein.

For example, the obtained assistance candidate information is:
templatel=INSERT OVERWRITE DIRECTORY
template2=INSERT OVERWRITE LOCAL DIRECTORY
template3=INSERT OVERWRITE TABLE
tempalte4=INSERT INTO
template5=INSERT INTO TABLE.

The assistance candidate information and the initial terminator INSERT may be sorted, and a sequence obtained after sorting is:
INSERT
INSERT INTO
INSERT INTO TABLE
INSERT INTO OVERWRITE TABLE
INSERT INTO OVERWRITE DIRECTORY
INSERT INTO OVERWRITE LOCAL DIRECTORY For example, it is code assistance information corresponding to INSERT.

Step 208. Output the code assistance information corresponding to the input content information.

In the embodiments of the present disclosure, step 208 may be for example: sending the code assistance information corresponding to the input content information to a text editor corresponding to a current IDE, and the text editor displays the code assistance information corresponding to the input content information.

For example, code assistance information corresponding to "INSERT" is as follows:
INSERT
INSERT INTO INSERT INTO TABLE
INSERT INTO OVERWRITE TABLE
INSERT INTO OVERWRITE DIRECTORY
INSERT INTO OVERWRITE LOCAL DIRECTORY A schematic diagram of a display interface of the code assistance information is shown in FIG. 7. The display interface of the code assistance information may be a display interface of the text editor.

In the embodiments of the present disclosure, after step 208, the method may further include: receiving an information choosing instruction corresponding to the code assistance information, where the information choosing instruction is used to instruct to choose information from the code assistance information; and updating the input content information according to the chosen information.

For example, if information chosen by a program developer according to the information choosing instruction is INSERT INTO TABLE, the current input content information INSERT may be updated by using INSERT INTO TABLE.

Further, after the updating the input content information according to the chosen information, the method may further include storing the information into the historical input status information. The information is stored into the historical input status information, so that subsequently, the initial terminator and the assistance candidate information can be sorted conveniently.

Figure 8:
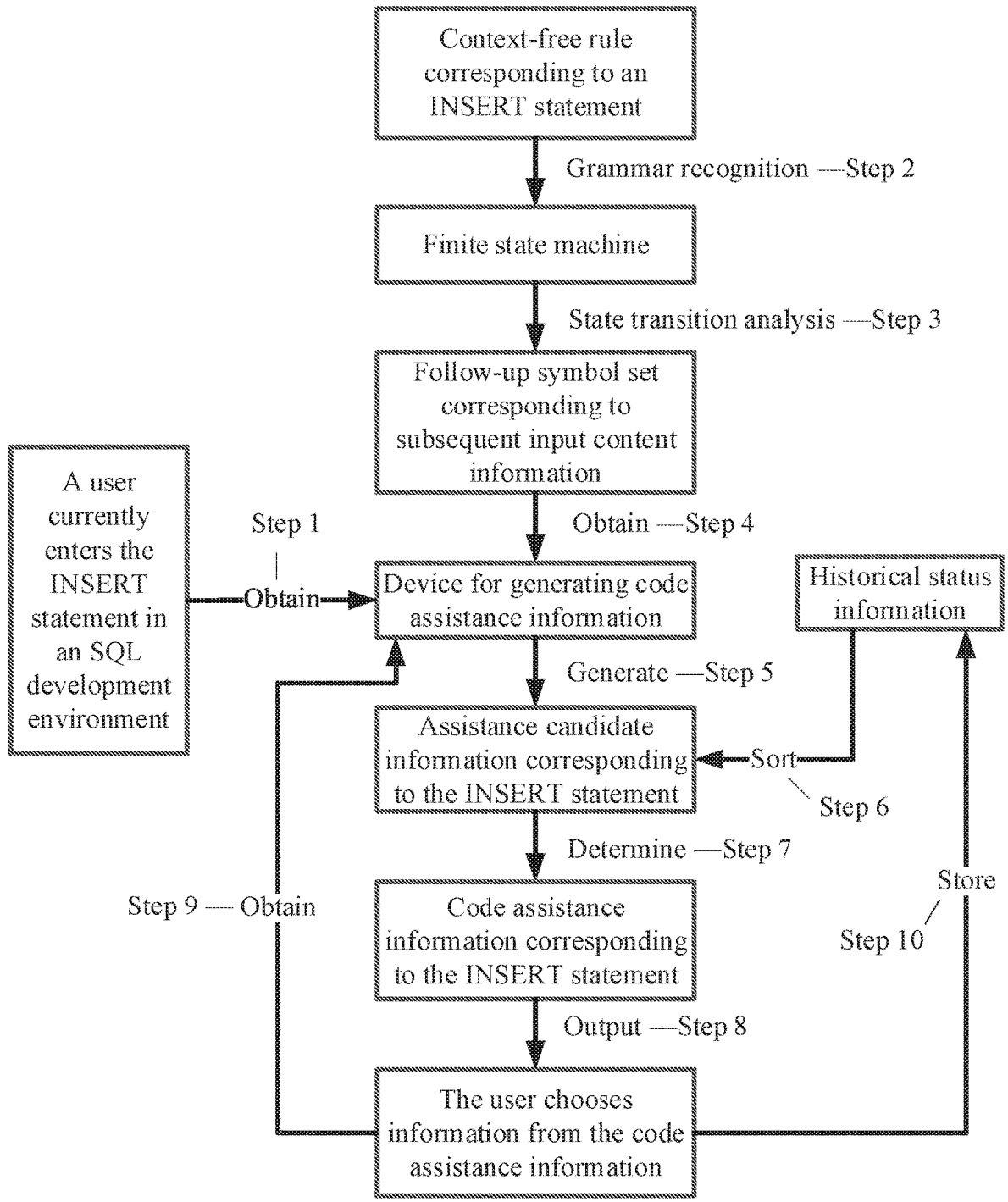
FIG. 8 is a flowchart of a code assistance method during a program development process according to an embodiment of the present disclosure.

In the embodiments of the present disclosure, an exemplary application scenario may be shown as follows, but is not limited thereto. The exemplary application scenario includes a code assistance method in a program development process, as shown in FIG. 8.

Step 1. When the user enters the INSERT statement in a text editor corresponding to an SQL development environment, the device for generating code assistance information obtains the INSERT statement by using the text editor.

Step 2. The device for generating code assistance information recognizes, by using a grammar rule recognizer, a context-free grammar rule corresponding to the INSERT statement, and parses and transforms the context-free grammar rule corresponding to the INSERT statement into a finite state machine. The context-free grammar rule corresponding to the INSERT statement is shown in FIG. 7.

Step 3. The device for generating code assistance information generates a follow-up symbol set Follow(S) corresponding to subsequent input content information corresponding to the INSERT statement according to the input content information in the finite state machine and the transform rule in the finite state machine by using the state transition analyzer.

Step 4. The device for generating code assistance information obtains Follow(S).

Step 5. The device for generating code assistance information generates assistance candidate information of the subsequent input content information corresponding to the INSERT statement according to the INSERT statement and Follow(S), as shown in the following:
templatel=INSERT OVERWRITE DIRECTORY
template2=INSERT OVERWRITE LOCAL DIRECTORY
template3=INSERT OVERWRITE TABLE
tempalte4=INSERT INTO
template5=INSERT INTO TABLE.

Step 6. The device for generating code assistance information sorts the assistance candidate information and the INSERT statement according to the historical input status information.

Step 7. The device for generating code assistance information determines the sorted assistance candidate information and INSERT statement as code assistance information corresponding to the INSERT statement.

Step 8. Output the code assistance information corresponding to the INSERT statement, as shown in FIG. 9.

Step 9. When the user chooses an INSERT INTO statement from the code assistance information shown in FIG. 9, obtain the INSERT INTO statement, and update the INSERT statement in the text editor by using the INSERT INTO statement.

Step 10. Store INSERT INTO statement into the historical input status information.

In the another method for generating code assistance information in the embodiments of the present disclosure, first, the input status information corresponding to the current program development process is obtained, and the input status information includes the input content information and the input language environment information. The preset grammar rule corresponding to the input status information is obtained, the preset grammar rule stores the association relationship between different statement information, and different input status information corresponds to different preset grammar rules. The code assistance information corresponding to the input content information is generated according to the preset grammar rule corresponding to the input status information. Compared with a current method that names of all language elements are used as code assistance information and displayed to a program developer, and code assistance information filtering is performed according to contents entered by the program developer, in the embodiments of the present disclosure, the code assistance information corresponding to the input content information is generated according to the input content information and the preset grammar rule corresponding to the input status information, so that the precision of the code assistance information can be improved, and the waste of system resources caused by the large amount of useless information in the code assistance information includes can be avoided.

Figure 3:
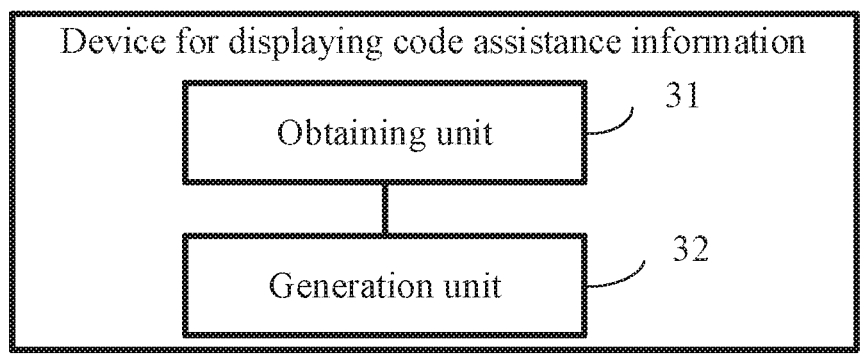
FIG. 3 is a schematic structural diagram of a device for generating code assistance information according to an embodiment of the present disclosure.

Further, in an exemplary implementation of the method shown in FIG. 1, an embodiment of the present disclosure provides a device for generating code assistance information. As shown in FIG. 3, the device may include an obtaining unit 31 and a generation unit 32.

The obtaining unit 31 is configured to obtain input status information corresponding to a current program development process, where the input status information includes input content information and input language environment information.

The obtaining unit 31 is further configured to obtain a preset grammar rule corresponding to the input status information, where the preset grammar rule stores an association relationship between different statement information, and different input status information corresponds to different preset grammar rules.

The generation unit 32 is configured to generate code assistance information corresponding to the input content information according to the preset grammar rule corresponding to the input status information.

The device embodiment corresponds to the method embodiment. For the convenience of reading, detailed contents in the method embodiment are not described in the device embodiment again, but the device in this embodiment may correspond to the contents described in the method embodiment.

In the device for generating code assistance information in the embodiments of the present disclosure, first, the input status information corresponding to the current program development process is obtained, and the input status information includes the input content information and the input language environment information. The preset grammar rule corresponding to the input status information is obtained, the preset grammar rule stores the association relationship between different statement information, and different input status information corresponds to different preset grammar rules. The code assistance information corresponding to the input content information is generated according to the preset grammar rule corresponding to the input status information. Compared with a current method that names of all language elements are used as code assistance information and displayed to a program developer, and code assistance information filtering is performed according to contents entered by the program developer, in the embodiments of the present disclosure, the code assistance information corresponding to the input content information is generated according to the preset grammar rule corresponding to the input status information, so that the precision of the code assistance information can be improved, and the waste of system resources caused by the large amount of useless information in the code assistance information can be avoided.

Figure 4:
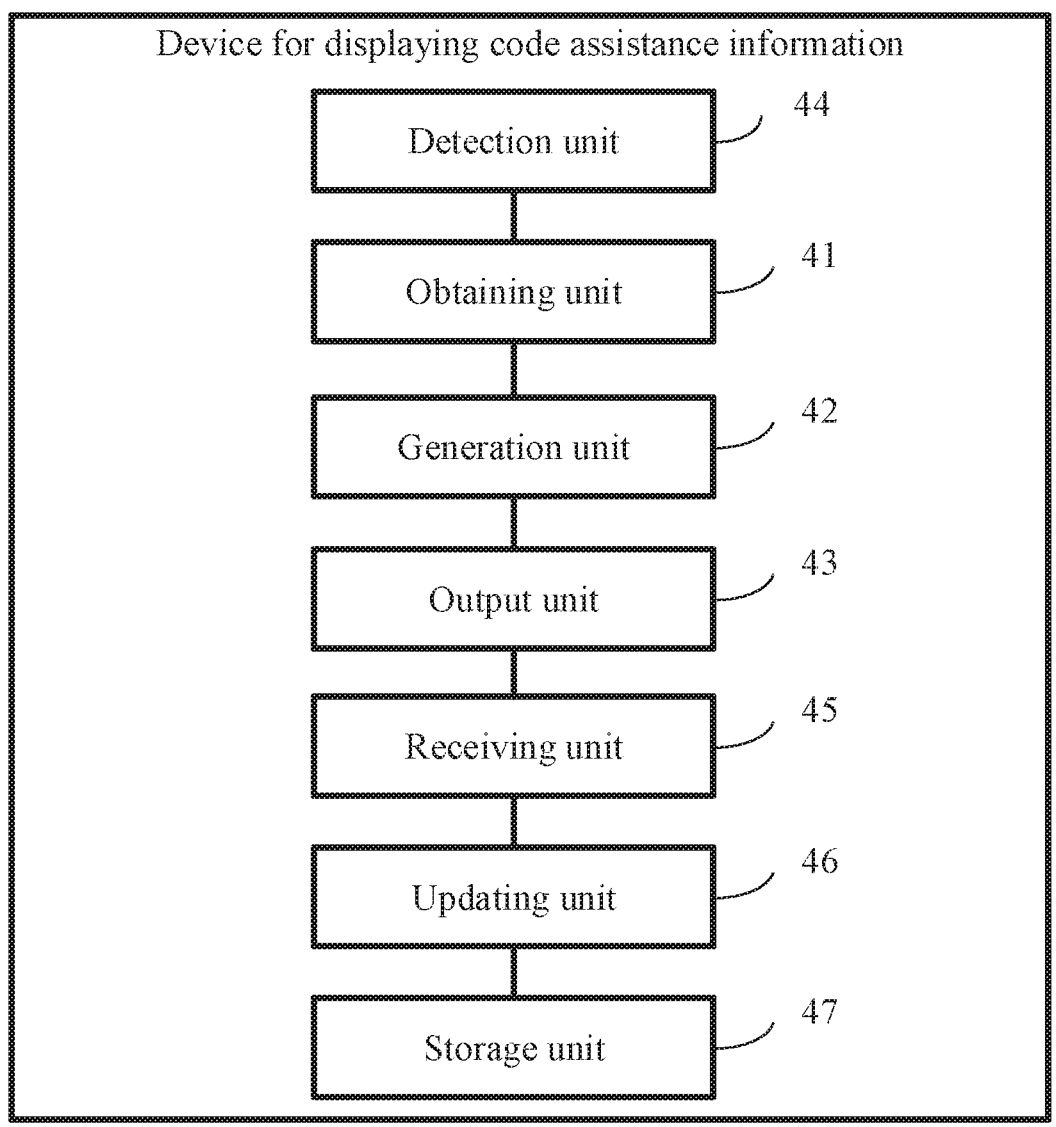
FIG. 4 is a schematic structural diagram of another device for generating code assistance information according to an embodiment of the present disclosure.

Further, in an exemplary implementation of the method shown in FIG. 2, an embodiment of the present disclosure provides another device for generating code assistance information. As shown in FIG. 4, the device may include an obtaining unit 41 and a generation unit 42.

The obtaining unit 41 is configured to obtain input status information corresponding to a current program development process, where the input status information includes input content information and input language environment information.

The obtaining unit 41 is further configured to obtain a preset grammar rule corresponding to the input status information, where the preset grammar rule stores an association relationship between different statement information, and different input status information corresponds to different preset grammar rules.

The generation unit 42 is configured to generate code assistance information corresponding to the input content information according to the input content information and the preset grammar rule corresponding to the input status information.

Further, the device includes an output unit 43.

The output unit 43 is configured to output the code assistance information corresponding to the input content information.

Further, the device includes a detection unit 44.

The detection unit 44 is configured to detect whether the input content information includes preset information, where the preset information is special separation character information.

The obtaining unit 41 is for example configured to: if the input content information includes the preset information, perform the obtaining a preset grammar rule corresponding to the input status information.

Further, the generation unit 41 includes an obtaining module, a first generation module, an association module, and a second generation module.

The obtaining module is configured to obtain a finite state machine corresponding to the preset grammar rule, where the finite state machine stores a transform rule between different statement information.

The first generation module is configured to generate a follow-up symbol set corresponding to subsequent input content information corresponding to the input content information according to the input content information and the transform rule, where the follow-up symbol set includes a grammar production set of the transform rule, a non-terminator set corresponding to the grammar production, and an initial terminator set corresponding to the grammar production.

The association module is configured to associate a grammar expansion corresponding to a non-terminator in the non-terminator set with another grammar expansion of an initial terminator in the initial terminator set.

The second generation module is configured to generate the code assistance information corresponding to the input content information according to an association result.

The association module is for example configured to: when the grammar expansion corresponding to the non-terminator is equal to the grammar expansion of the initial terminator, determine the grammar expansion of the initial terminator as assistance candidate information of the subsequent input content information.

The second generation module is for example configured to determine the initial terminator and the assistance candidate information as the code assistance information corresponding to the input content information.

The generation unit 42 further includes a determining module.

The obtaining module is configured to obtain a grammar production corresponding to the non-terminator and corresponding to the initial terminator in the initial terminator set.

The determining module is configured to determine, as the grammar expansion corresponding to the non-terminator, a result obtained after all non-terminators in the grammar production are cyclically expanded until the all non-terminators are eliminated.

The obtaining module is further configured to obtain historical input status information corresponding to the input status information.

The sorting module is configured to sort the initial terminator and the assistance candidate information according to the historical input status information.

The determining module is for example configured to determine the sorted initial terminator and assistance candidate information as the code assistance information corresponding to the input content information.

Further, the device further includes a receiving unit 45 and an updating unit 46.

The receiving unit 45 is configured to receive an information choosing instruction corresponding to the code assistance information, where the information choosing instruction is used to instruct to choose information from the code assistance information.

The updating unit 46 is configured to update the input content information according to the chosen information.

Further, the device further includes a storage unit 47.

The storage unit is configured to store the information into the historical input status information.

In some embodiments, the various modules and units of the device for displaying code assistance information may be implemented as software instructions (or a combination of software and hardware). That is, the device for displaying code assistance information described with reference to FIG. 3 and FIG. 4 may comprise a processor and a non-transitory computer-readable storage medium storing instructions that, when executed by the processor, cause one or more components (e.g., the processor) of the device for displaying code assistance information to perform various steps and methods of the modules and units described above. The device for displaying code assistance information may also be referred to as a system for displaying code assistance information. In some embodiments, the device for displaying code assistance information may include a mobile phone, a tablet computer, a PC, a laptop computer, a server, or another computing device.

The device embodiment corresponds to the method embodiment. For the convenience of reading, detailed contents in the method embodiment are not described in the device embodiment again, but the device in this embodiment may correspond to the contents described in the method embodiment.

In the another device for generating code assistance information in the embodiments of the present disclosure, first, the input status information corresponding to the current program development process is obtained, and the input status information includes the input content information and the input language environment information. The preset grammar rule corresponding to the input status information is obtained, the preset grammar rule stores the association relationship between different statement information, and different input status information corresponds to different preset grammar rules. The code assistance information corresponding to the input content information is generated according to the input content information and the preset grammar rule corresponding to the input status information. Compared with a current method that names of all language elements are used as code assistance information and displayed to a program developer, and code assistance information filtering is performed according to contents entered by the program developer, in the embodiments of the present disclosure, the code assistance information corresponding to the input content information is generated according to the preset grammar rule corresponding to the input status information, so that the precision of the code assistance information can be improved, and the waste of system resources caused by the large amount of useless information in the code assistance information can be avoided.

In some embodiments, a device for displaying the code assistance information includes a processor and a memory. The obtaining unit, the generation unit, the output unit, the detection unit, the updating unit, the storage unit, and the like are stored in the memory as program units. The processor executes the program units stored in the memory, to implement corresponding functions, such as various steps and methods described herein.

The processor includes a kernel, and the kernel invokes the corresponding program units in the memory. There may be one or more kernels. A problem of display stalling when a chosen picture in a table is displayed is resolved by adjusting a kernel parameter.

The memory may include a volatile memory, a random access memory (RAM), a non-volatile memory, and/or the like in a computer storage medium, for example, a read-only memory (ROM) or a flash memory (flash RAM). The memory includes at least one storage chip.

This disclosure further provides a computer program product. When the computer program product is executed on a data processing device, the computer program product is configured to execute program code initialized with the following method steps: obtaining input status information corresponding to a current program development process, where the input status information includes input content information and input language environment information; obtaining a preset grammar rule corresponding to the input status information, where the preset grammar rule stores an association relationship between different statement information, and different input status information corresponds to different preset grammar rules; and generating code assistance information corresponding to the input content information according to the input content information and the preset grammar rule corresponding to the input status information.

A person skilled in the art should understand that the embodiments of this disclosure may be provided as a method, a system, or a computer program product. Therefore, the described embodiments may each use an all hardware embodiment, an all software embodiment, or an embodiment combining software and hardware. In addition, the described embodiments may each use a computer program product implemented on one or more computer available storage mediums (including, but not limited to, a magnetic memory, a CD-ROM, and an optical memory) including computer available program code.

This disclosure is described with reference to a flowchart and/or block diagram of a method and device for displaying code assistance information and a computer program product in the embodiments of this disclosure. Computer program instructions can implement each process and/or block in the flowcharts and/or block diagrams and a combination of processes and/or blocks in the flowcharts and/or block diagrams. These computer program instructions may be provided to a general-purpose computer, a dedicated computer, an embedded processor, or a processor of another programmable data processing device to generate a machine, so that an apparatus configured to implement functions specified in one or more processes in the flowcharts and/or one or more blocks in the block diagrams is generated by using instructions executed by the general-purpose computer or the processor of another programmable data processing device.

These computer program instructions may also be stored in a computer-readable memory that can guide a computer or another programmable data processing device to work in a specific manner, so that the instructions stored in the computer-readable memory generate a product including an instruction apparatus, where the instruction apparatus implements functions specified in one or more processes in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more processes in the flowcharts and/or one or more blocks in the block diagrams.

In an exemplary configuration, a computing device includes one or more processors (CPUs), an input/output interface, a network interface, and a memory.

The memory may include a volatile memory, a RAM, a non-volatile memory, and/or the like in a computer storage medium, for example, a ROM or a flash memory (flash RAM). The memory is an example of a computer-readable medium.

The computer-readable medium includes a persistent and non-persistent, removable and non-removable medium, and can implement information storage by using any method or technology. Information may be a computer-readable instruction, a data structure, a program module, or other data. An example of a storage medium of a computer includes but is not limited to a phase change memory (PRAM), a static random access memory (SRAM), a dynamic random access memory (DRAM), another type of RAM, a ROM, an electrically erasable programmable read only memory (EEPROM), a flash memory or another memory technology, a compact disc read-only memory (CD-ROM), a digital versatile disc (DVD) or another optical storage, a cassette tape, magnetic tape/magnetic disk storage or any other non-transmission medium. The storage medium may be configured to store information accessible by the computing device. As defined in this specification, the computer-readable medium does not include a transitory computer-readable medium (transitory media), such as a modulated data signal and carrier.

The foregoing descriptions are merely exemplary, and are not intended to limit this disclosure. For a person skilled in the art, various modifications and changes may be made to this disclosure. Any modifications, equivalent replacements, and improvements made within the spirit and principle of this disclosure shall fall within the scope of the claims of this disclosure.

What is claimed is:

1. A method for generating code assistance information, comprising:
    obtaining input status information corresponding to a program development process, wherein the input status information comprises input content information and input language environment information;
    obtaining a preset grammar rule corresponding to the input status information, wherein the preset grammar rule stores an association relationship between different statement information, and different input status information corresponds to different preset grammar rules;
    obtaining a transform rule between different statement information based on the preset grammar rule;
    generating a follow-up symbol set corresponding to subsequent input content information corresponding to the input content information according to the input content information and the transform rule, wherein the follow-up symbol set comprises a grammar production set of the transform rule, a non-terminator set corresponding to the grammar production, and an initial terminator set corresponding to the grammar production;
    associating a grammar expansion corresponding to a non-terminator in the non-terminator set with a grammar expansion of an initial terminator in the initial terminator set; and
    generating code assistance information corresponding to the input content information according to the associated result of the grammar expansion corresponding to the non-terminator with the grammar expansion of the initial terminator.

2. The method according to claim 1, further comprising:
    after the generating code assistance information corresponding to the input content information, outputting the code assistance information.

3. The method according to claim 2, further comprising:
    after the outputting the code assistance information,
    receiving an information choosing instruction corresponding to the code assistance information, wherein the information choosing instruction indicates chosen data from the code assistance information; and
    updating the input content information according to the chosen data.

4. The method according to claim 3, further comprising:
    after the updating the input content information according to the chosen data,
    storing the chosen data into the historical input status information.

5. The method according to claim 1, further comprising:
    after the obtaining a preset grammar rule corresponding to the input status information,
    detecting whether the input content information comprises preset information, wherein the preset information is special separation character information; and
    if the input content information comprises the preset information, performing the obtaining a preset grammar rule corresponding to the input status information.

6. The method according to claim 1, wherein the obtaining a transform rule between different statement information based on the preset grammar rule comprises:
    obtaining a finite state machine corresponding to the preset grammar rule, wherein the finite state machine stores a transform rule between different statement information.

7. The method according to claim 1, wherein:
    the associating a grammar expansion corresponding to a non-terminator in the non-terminator set with a grammar expansion of an initial terminator in the initial terminator set comprises:
        when the grammar expansion corresponding to the non-terminator is equal to the grammar expansion of the initial terminator, determining the grammar expansion of the initial terminator as assistance candidate information of the subsequent input content information; and
    the generating the code assistance information corresponding to the input content information comprises:

determining the initial terminator and the assistance candidate information as the code assistance information corresponding to the input content information.

8. The method according to claim 7, further comprising:
before the determining the initial terminator and the assistance candidate information as the code assistance information corresponding to the input content information:
obtaining historical input status information corresponding to the input status information; and
sorting the initial terminator and the assistance candidate information according to the historical input status information; and wherein:
the determining the initial terminator and the assistance candidate information as the code assistance information corresponding to the input content information comprises:
determining the sorted initial terminator and assistance candidate information as the code assistance information corresponding to the input content information.

9. The method according to claim 1, further comprising:
before the associating a grammar expansion corresponding to a non-terminator in the non-terminator set with a grammar expansion of an initial terminator in the initial terminator set, obtaining a grammar production corresponding to the non-terminator and corresponding to the initial terminator in the initial terminator set; and
determining, as the grammar expansion corresponding to the non-terminator, a result obtained after all non-terminators in the grammar production are cyclically expanded until the all non-terminators are eliminated.

10. A device for generating code assistance information, comprising one or more processors and one or more non-transitory computer-readable storage media storing instructions that, when executed by the processors, cause the one or more processors to perform operations comprising:
obtaining input status information corresponding to a program development process, wherein the input status information comprises input content information and input language environment information;
obtaining a preset grammar rule corresponding to the input status information, wherein the preset grammar rule stores an association relationship between different statement information, and different input status information corresponds to different preset grammar rules;
obtaining a transform rule between different statement information based on the preset grammar rule;
generating a follow-up symbol set corresponding to subsequent input content information corresponding to the input content information according to the input content information and the transform rule, wherein the follow-up symbol set comprises a grammar production set of the transform rule, a non-terminator set corresponding to the grammar production, and an initial terminator set corresponding to the grammar production;
associating a grammar expansion corresponding to a non-terminator in the non-terminator set with a grammar expansion of an initial terminator in the initial terminator set; and
generating code assistance information corresponding to the associated result of the grammar expansion corresponding to the non-terminator with the grammar expansion of the initial terminator.

11. The device according to claim 10, wherein the instructions further cause the one or more processors to perform:

after the generating code assistance information corresponding to the input content information, outputting the code assistance information.

12. The device according to claim 11, wherein the instructions further cause the one or more processors to perform:
after the outputting the code assistance information, receiving an information choosing instruction corresponding to the code assistance information, wherein the information choosing instruction is used to instruct to choose information from the code assistance information; and
updating the input content information according to the chosen information.

13. The device according to claim 12, wherein the instructions further cause the one or more processors to perform:
after the updating the input content information according to the chosen information, storing the information into historical input status information.

14. The device according to claim 10, wherein the instructions further cause the one or more processors to perform:
after the obtaining a preset grammar rule corresponding to the input status information,
detecting whether the input content information comprises preset information, wherein the preset information is special separation character information; and
if the input content information comprises the preset information, performing the obtaining a preset grammar rule corresponding to the input status information.

15. The device according to claim 10, wherein the obtaining a transform rule between different statement information based on the preset grammar rule comprises:
obtaining a finite state machine corresponding to the preset grammar rule, wherein the finite state machine stores a transform rule between different statement information.

16. The device according to claim 10, wherein the associating a grammar expansion corresponding to a non-terminator in the non-terminator set with another grammar expansion of an initial terminator in the initial terminator set comprises:
when the grammar expansion corresponding to the non-terminator is equal to the grammar expansion of the initial terminator, determining the grammar expansion of the initial terminator as assistance candidate information of the subsequent input content information; and
the generating the code assistance information corresponding to the input content information comprises:
determining the initial terminator and the assistance candidate information as the code assistance information corresponding to the input content information.

17. The device according to claim 16, wherein the instructions further cause the one or more processors to perform:
before the determining the initial terminator and the assistance candidate information as the code assistance information corresponding to the input content information,
obtaining historical input status information corresponding to the input status information; and
sorting the initial terminator and the assistance candidate information according to the historical input status information; and wherein:

the determining the initial terminator and the assistance candidate information as the code assistance information corresponding to the input content information comprises:
  determining the sorted initial terminator and assistance candidate information as the code assistance information corresponding to the input content information.

18. The device according to claim 10, wherein the instructions further cause the one or more processors to perform:
  before the associating a grammar expansion corresponding to a non-terminator in the non-terminator set with another grammar expansion of an initial terminator in the initial terminator set, obtaining a grammar production corresponding to the non-terminator and corresponding to the initial terminator in the initial terminator set; and
  determining, as the grammar expansion corresponding to the non-terminator, a result obtained after all non-terminators in the grammar production are cyclically expanded until the all non-terminators are eliminated.

19. A non-transitory computer-readable storage medium storing instructions that, when executed by one or more processors, cause the processors to perform operations comprising:
  obtaining input status information corresponding to a program development process, wherein the input status information comprises input content information and input language environment information;
  obtaining a preset grammar rule corresponding to the input status information, wherein the preset grammar rule stores an association relationship between different statement information, and different input status information corresponds to different preset grammar rules;
  obtaining a transform rule between different statement information based on the preset grammar rule;
  generating a follow-up symbol set corresponding to subsequent input content information corresponding to the input content information according to the input content information and the transform rule, wherein the follow-up symbol set comprises a grammar production set of the transform rule, a non-terminator set corresponding to the grammar production, and an initial terminator set corresponding to the grammar production;
  associating a grammar expansion corresponding to a non-terminator in the non-terminator set with a grammar expansion of an initial terminator in the initial terminator set; and
  generating code assistance information corresponding to the input content information according to the associated result of the grammar expansion corresponding to the non-terminator with the grammar expansion of the initial terminator.

20. The storage medium according to claim 19, wherein the obtaining a transform rule between different statement information based on the preset grammar rule comprises:
  obtaining a finite state machine corresponding to the preset grammar rule, wherein the finite state machine stores a transform rule between different statement information.

\* \* \* \* \*